Feb. 18, 1941. F. P. FEHN 2,232,599
ROTARY FLUID POWER DEVICE
Filed Sept. 16, 1939 2 Sheets-Sheet 1

Inventor
Frank P. Fehn

Feb. 18, 1941.   F. P. FEHN   2,232,599
ROTARY FLUID POWER DEVICE
Filed Sept. 16, 1939   2 Sheets-Sheet 2

Inventor
Frank P. Fehn

Patented Feb. 18, 1941

2,232,599

UNITED STATES PATENT OFFICE 2,232,599

ROTARY FLUID POWER DEVICE

Frank P. Fehn, Canton, Ohio

Application September 16, 1939, Serial No. 295,298

4 Claims. (Cl. 103—139)

The invention relates to rotary fluid power devices which may be power driven so as to operate as a pump or compressor; or which may be driven by fluid pressure so as to operate as a motor.

The object of the invention is to provide a simple, inexpensive and efficient rotary apparatus for use in the class of machines through which fluids are passed for circulating or compression, or which are operated by fluid under pressure in order to develop power.

Another object is to provide a rotary apparatus of the character referred to in which a plurality of impeller vanes are carried in the rotor of the apparatus and provided with tapered ends arranged to ride around a tapered channel in the stationary housing.

Another object is to provide an annular abutment in the annular channel of the housing having inclined ends over which the impeller vanes travel and provided with elongated ports communicating with the intake and discharge lines for the fluid.

A further object is to provide a solid rotor head having radial slots through which the impeller vanes operate.

A further object is to have relief channels alongside of the impeller vanes or blades.

A still further object is to provide an end adjustment upon the shaft of the rotor.

Figures 1, 2, 3:
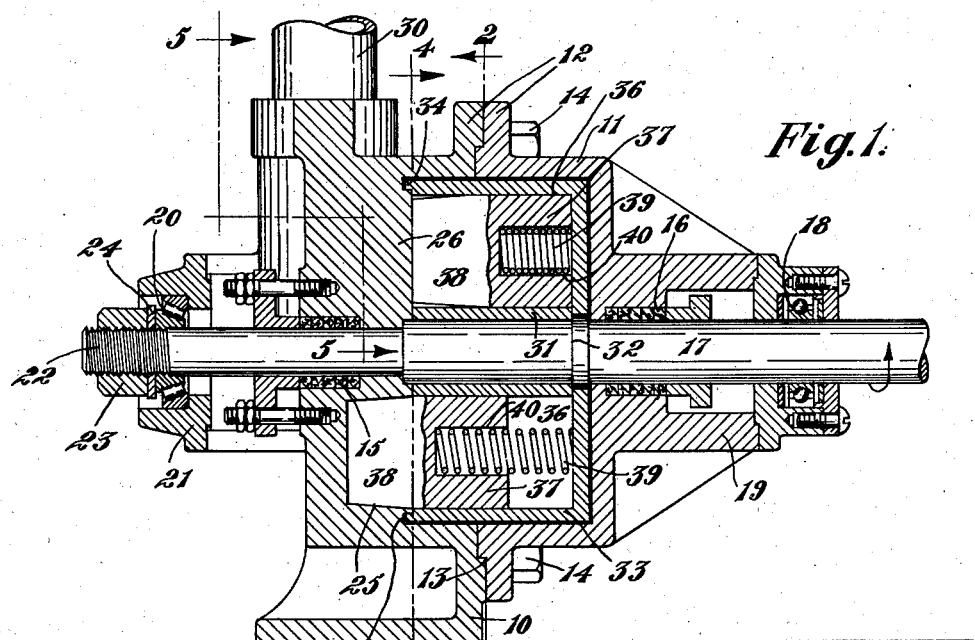
Figure 4:
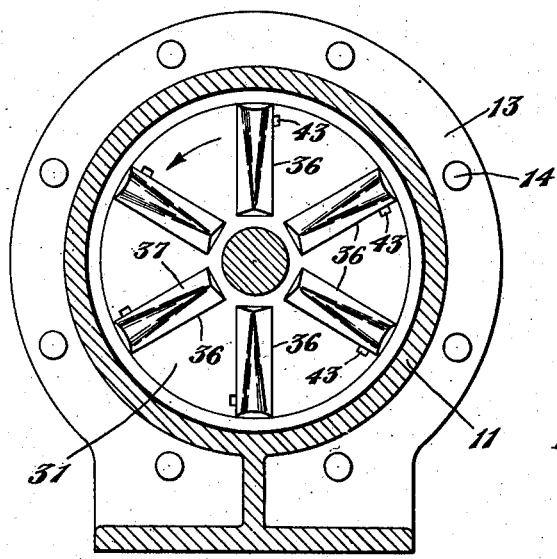
Figures 5, 6:
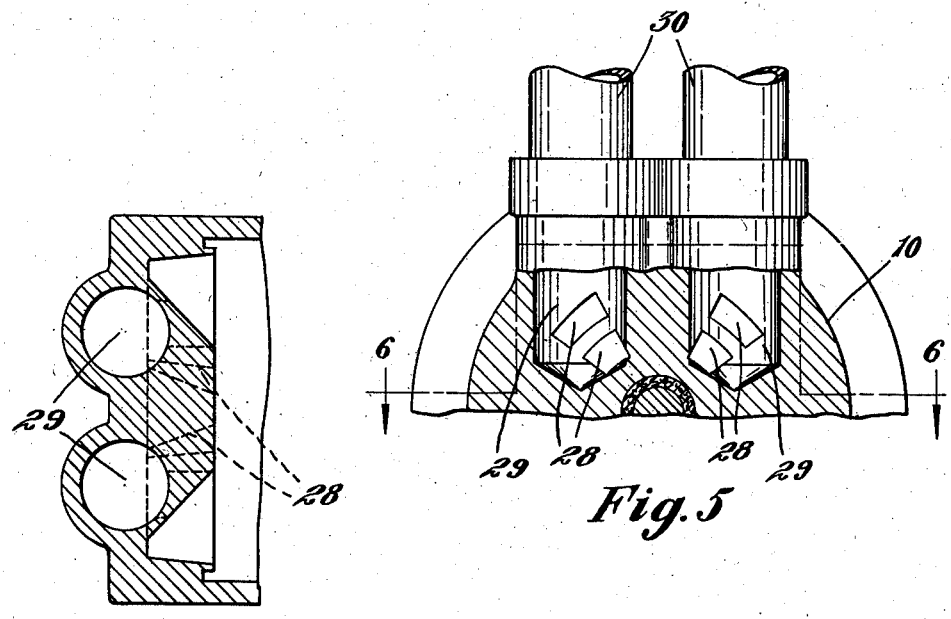

The above objects together with others which will be apparent from the drawings and following description may be attained by constructing the improved fluid power device in the manner illustrated in the accompanying drawings in which Figure 1 is a longitudinal sectional view through the fluid power apparatus embodying the invention;

Fig. 2, a section on the line 2—2, Fig. 1 with the rotor removed;

Fig. 3, a detached perspective view with one of the impeller vanes or blades;

Fig. 4, a section on the line 4—4, Fig. 1;

Fig. 5, a section on the line 5—5, Fig. 1; and

Fig. 6, a section on the line 6—6, Fig. 5.

Similar numerals refer to similar parts throughout the several views.

The housing is formed of two sections indicated generally at 10 and 11 which are provided with complemental flanges 12 preferably interlocked as at 13, to provide a fluid tight joint and attached together as by the bolts 14.

Stuffing boxes 15 and 16 are formed in the housing members 10 and 11, respectively, to prevent leakage around the shaft 17. This shaft is journaled in a ball-bearing 18 carried at the outer end of the reduced neck 19 of the housing member 11 and in a roller bearing 20 carried in the bearing bracket 21 at the outer end of the housing member 10.

This end of the shaft 17 may be threaded as at 22 to receive an adjusting nut 23 and washer 24 to provide end adjustment of the shaft.

The opposite end of the shaft 17 may be provided with a pulley, sprocket, or its equivalent for connecting the shaft to a motor or engine when the apparatus is used as a pump or compressor or for connecting it to any mechanism to be driven when the apparatus is used as a motor or power unit.

A tapered annular channel 25 is formed in the housing member 10 and at one point thereon an annular abutment 26 is formed and provided with the inclined ends 27 in which are formed the elongated ports 28 covering substantially the entire area of the inclined surfaces 27 and communicating with the passages 29 to which are connected the fluid inlet and outlet pipes 30.

The rotor is in the form of a solid cylindric head 31 fixed upon the shaft 17 as by a pressed fit or otherwise with its outer end abutting the shoulder 32 upon the shaft.

A cup 33 surrounds the outer end and sides of the rotor 31 and has the reduced peripheral edge 34 rotatably mounted within the annular groove 35 formed in the housing member 10 surrounding the tapered channel 25 therein.

Radial slots 36 are formed through the solid rotor 31 extending from a point near the center thereof through the peripheral edge, and the impeller vanes or blades 37 are slidably mounted within these slots and provided with tapered inner ends 38 adapted to be urged into the tapered channel 25 of the housing by means of coil springs 39 located in sockets 40 in the outer ends of the blades and against the cup 33.

The inner end of each impeller vane or blade is preferably bevelled as indicated at 41, the edge 42 riding against the bottom of the tapered channel 25 in the housing, while the tapered side edges of the blades have a sliding fit within said tapered channel.

Longitudinal grooves 43 are formed through the solid rotor 31 communicating with the rear side of each slot 36 in which the impeller vanes or blades 37 are mounted so as to permit any excess pressure of liquid to pass therethrough from one side of the rotor to the other.

In the operation of the apparatus, as a pump or compressor, the shaft 17 is driven at the desired speed by means of a motor or other prime mover, and the fluid to be pumped or compressed is admitted through one of the pipes 30 to the corresponding passage 29 and through the corresponding ports 28.

Assuming that the apparatus is being used as a pump or compressor and the shaft 17 power driven in the direction of the arrows shown in Figs. 1, 2 and 4, the right hand pipe 30, as viewed in Fig. 2, will be the inlet pipe and the left hand pipe 30 in said figure is the outlet pipe.

As the fluid is admitted through the ports 28 on the right hand inclined end 27 of the abutment 26, the fluid will be carried around the tapered channel 25 in clockwise direction by means of the impeller blades or vanes 37 riding down said right hand inclined surface 27 and around the channel 25 and will be discharged through the ports 28 in the left hand inclined end 27 of the abutment 26, the fluid being discharged through the left hand pipe 30.

In the event it is desired to use the apparatus as a fluid power device, the fluid will be admitted under pressure through one of the pipes 30 and exhausted through the other pipe 30, this fluid under pressure forcing the impeller vanes or blades and the rotor in which they are carried to rotate within the housing and any desired apparatus may be driven from the rotating shaft 17.

I claim:

1. A rotary fluid power device comprising a housing having an annular tapered channel therein, an abutment in said channel having a flat top and oppositely inclined ends each inclined end of the abutment being provided with elongated ports, fluid inlet and discharge means communicating with said ports, an axial shaft journaled through the housing, a rotor on said shaft, axially movable impeller blades on the rotor having tapered ends slidably fitting said channel, and resilient means for urging said blades into said channel, a tapered roller bearing upon one end of the rotor shaft, the adjacent portion of the shaft being screw-threaded and a nut upon the threaded portion of the shaft engaging the roller bearing for axially adjusting the rotor.

2. A rotary fluid power device comprising a housing having an annular channel therein, an abutment in said channel having inclined ends provided with ports, fluid inlet and discharge means communicating with said ports, an axial shaft journaled through the housing, a solid rotor on said shaft having radial slots therein open through the periphery thereof, impeller blades axially slidably mounted in said slots, a cup surrounding said rotor and secured thereto to rotate therewith, an annular groove in the housing, surrounding said annular channel, in which the edge of said cup is slidably located, and resilient means between each blade and the cup for urging the blades into the annular channel.

3. A rotary fluid power device comprising a housing having an annular tapered channel therein, an abutment in said channel having inclined ends provided with a plurality of elongated ports extending over substantially the entire areas of each of said inclined ends, fluid inlet and discharge means communicating with said ports, an axial shaft journaled through the housing, a solid rotor on said shaft having radial slots therein, impeller blades axially slidably mounted in said slots and having tapered ends slidably fitting said tapered channel, resilient means for urging said blades into said channel, longitudinal grooves in said rotor communicating with said slots, a tapered roller bearing at one end of the rotor shaft, the adjacent portion of the shaft being screw-threaded and a nut upon the threaded portion of the shaft engaging the roller bearing for axially adjusting the rotor.

4. A rotary fluid power device comprising a housing having an annular, tapered channel therein, an abutment in said channel having oppositely inclined ends provided with elongated ports, fluid inlet and discharge means communicating with said ports, an axial shaft journaled through the housing, a solid rotor on said shaft having radial slots extending axially entirely therethrough and open through the periphery thereof, impeller blades axially slidably mounted in said slots and having tapered inner ends slidably fitting said tapered channel, a cup surrounding the outer end and sides of said rotor and secured thereto to rotate therewith and springs between the impeller blades and the cup for normally urging the tapered inner ends of the blades into said tapered channel.

FRANK P. FEHN.